United States Patent
Xiao et al.

(10) Patent No.: US 9,612,482 B2
(45) Date of Patent: Apr. 4, 2017

(54) SUBSTRATE FITTING PROCESS AND SUBSTRATE ASSEMBLY TO BE FITTED

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Ang Xiao, Beijing (CN); Sunghun Song, Beijing (CN); Xu Chen, Beijing (CN)

(73) Assignees: BOE TECHNOLOGY GROUP CO., LTD., Beijing (CN); BEIJING OPTOELECTRONICS TECHNOLOGY CO., LTD., Beijing (CN)

( * ) Notice: Subject to any disclaimer, the term of this patent is extended or adjusted under 35 U.S.C. 154(b) by 305 days.

(21) Appl. No.: 14/488,134

(22) Filed: Sep. 16, 2014

(65) Prior Publication Data

US 2015/0293386 A1 Oct. 15, 2015

(30) Foreign Application Priority Data

Apr. 14, 2014 (CN) .......................... 2014 1 0149136

(51) Int. Cl.
*G02F 1/1339* (2006.01)
*B32B 3/02* (2006.01)
(Continued)

(52) U.S. Cl.
CPC .............. *G02F 1/1339* (2013.01); *B32B 3/02* (2013.01); *B32B 3/085* (2013.01);
(Continued)

(58) Field of Classification Search
CPC ...... G02F 1/1339; G02F 1/0107; G02F 1/161; G02F 1/1341
(Continued)

(56) References Cited

U.S. PATENT DOCUMENTS

2003/0025868 A1* 2/2003 Hiroshima .......... G02F 1/13394
349/156
2005/0200799 A1 9/2005 Murai
(Continued)

FOREIGN PATENT DOCUMENTS

| CN | 101957512 A | 1/2011 |
| CN | 202443223 U | 9/2012 |
| CN | 102707509 A | 10/2012 |

OTHER PUBLICATIONS

First Office Action regarding Chinese application No. 201410149136.9, dated Feb. 2, 2016. Translation provided by Dragon Intellectual Property Law Firm.

*Primary Examiner* — Thanh-Nhan P Nguyen
(74) *Attorney, Agent, or Firm* — Harness, Dickey & Pierce, P.L.C.

(57) ABSTRACT

The present invention provides a substrate fitting process and a substrate assembly to be fitted, wherein the substrate assembly to be fitted of the present invention, a periphery mold frame is disposed on a surface of a substrate, a cell mold frame is disposed inside said periphery mold frame, the height of said cell mold frame is larger than the height of said periphery mold frame. A substrate fitting process of the present invention comprises: providing a cell mold frame on a surface of a first substrate, providing a cell mold frame inside the periphery mold frame for sealing liquid crystal, the height of said cell mold frame is larger than the height of the periphery mold frame; extracting the air between the first substrate and the second substrate; making the first substrate fit with the second substrate preliminarily; filling
(Continued)

the air between the first substrate and the second substrate; making the first substrate further fit with the second substrate. With the technical solution of the present invention, the puncture caused by the impact of the in-cell liquid crystal onto the cell mold frame is prevented, and the time and the costs of the process is decreased, meanwhile the probability of the circuit metal wire and the component switch on the liquid crystal panel suffering corrode of the thinning acid is decreased.

15 Claims, 5 Drawing Sheets

(51) Int. Cl.
*B32B 3/08* (2006.01)
*G02F 1/1333* (2006.01)

(52) U.S. Cl.
CPC ... *B32B 2307/558* (2013.01); *B32B 2307/714* (2013.01); *B32B 2457/202* (2013.01); *G02F 2001/133354* (2013.01); *G02F 2001/133388* (2013.01)

(58) Field of Classification Search
USPC .................................................. 349/153, 190
See application file for complete search history.

(56) References Cited

U.S. PATENT DOCUMENTS

| | | | |
|---|---|---|---|
| 2010/0259707 A1 | 10/2010 | Iwata et al. | |
| 2011/0285954 A1* | 11/2011 | Minami | G02F 1/1339 349/153 |
| 2012/0268708 A1* | 10/2012 | Chida | G02F 1/133351 349/153 |
| 2013/0335688 A1* | 12/2013 | Jung | G02F 1/134336 349/130 |

* cited by examiner

SUBSTRATE FITTING PROCESS AND SUBSTRATE ASSEMBLY TO BE FITTED

CROSS-REFERENCE TO RELATED APPLICATION

The present application claims a priority of the Chinese patent application No. 201410149136.9 filed on Apr. 14, 2014, which is incorporated herein by reference in its entirety.

TECHNICAL FIELD

The present invention relates to the field of display technology, especially relates to a substrate fitting process and a substrate assembly to be fitted.

BACKGROUND

An array substrate and a color film substrate need to be pasted together by sealant in the existing manufacturing procedure of a liquid crystal display panel. The sealant is divided into main sealant for sealing in-cell liquid crystal and substrate periphery sealant for maintaining the stability of a gap between the substrates. As shown in FIG. 1, in the substrate fitting process of the prior art, a periphery mold frame 51 formed by the substrate periphery sealant is normally provided on a surface of a first substrate 50, a cell mold frame 52 formed by the main sealant is provided inside the periphery mold frame 51; making the first substrate 51 opposite to a second substrate 60, vacuumizing before cell alignment, then pressing the first substrate 50 (color film substrate) downward until these two substrates are fitted completely, and releasing the atmosphere finally, so that the cell alignment process is completed.

Because during the fitting procedure between the first substrate 51 and the second substrate 60, the main sealant and the substrate periphery sealant contact with another substrate (array substrate). After the cell alignment, the interior of the cell as well as the area between the main sealant and the substrate periphery sealant maintain vacuum state. When the atmosphere is released, liquid crystals 70 inside the cell mold frame 52 spread into the outside of the cell mold frame 52 rapidly and contact the cell mold frame 52, while the outside of the cell mold frame 52 is vacuum state, thereby the pressure inside the cell is larger than the pressure outside the cell mold frame 52, accordingly the impact of the liquid crystal onto the cell mold frame 52 is increased which can easily lead to puncture phenomenon, especially for a narrow border liquid crystal panel of which the width of the cell mold frame is relatively narrow (at this time the main sealant is not solidified which is likely to be impacted to cause puncture).

The existing method to solve the above mentioned problem is to make openings on the periphery mold frame 51 to let the air into the area between the cell mold frame 52 and the periphery mold frame 51, thereby preventing the puncture of the liquid crystal to the cell mold frame due to the pressure difference between inside and outside the cell mold frame. But the defects of the above solution are that: the acid liquor will be filled between the cell mold frame and the periphery mold frame in the subsequent thinning process because of the openings of the periphery mold frame, which will corrode circuit metal wire and component switch, and unnecessary losses are caused.

SUMMARY

The purpose of the present invention is to provide a substrate fitting process and a substrate assembly to be fitted which can effectively avoid the corrode on the circuit metal wire and component switch and prevent the puncture of the liquid crystal onto the main sealant caused by the pressure difference inside and outside the main sealant.

The substrate fitting process of the embodiment of the present invention, comprising:

providing a periphery mold frame on a surface of a first substrate, providing a cell mold frame inside said periphery mold frame, the height of said cell mold frame is larger than the height of said periphery mold frame;

making said first substrate opposite to a second substrate, the surface of said first substrate on which the periphery mold frame and the cell mold frame are disposed is opposite to said second substrate;

removing the air between the first substrate and the second substrate;

making said first substrate fit with said second substrate preliminarily, said cell mold frame contacts with said second substrate, and a gap between said periphery mold frame and said second substrate is formed;

filling the air between said first substrate and said second substrate; and making said first substrate further fit with said second substrate, said periphery mold frame and said second substrate are fitted closely.

The substrate fitting process of the embodiment of the present invention, wherein said first substrate is a color film substrate, said second substrate is an array substrate; or said first substrate is an array substrate, said second substrate is a color film substrate.

The substrate fitting process of the embodiment of the present invention, wherein before providing the periphery mold frame on the surface of said first substrate, providing a ring groove extending along the circumference direction of said first substrate on the surface of said first substrate, then providing said periphery mold frame inside said groove.

The substrate fitting process of the embodiment of the present invention, wherein said periphery mold frame and said cell mold frame are completed in a same production process.

The substrate fitting process of the embodiment of the present invention, wherein said groove comprises a groove bottom, a first side wall located inside said periphery mold frame, and a second side wall located outside said periphery mold frame.

The substrate fitting process of the embodiment of the present invention, wherein said periphery mold frame is located at said groove bottom of said groove, there are gaps between said periphery mold frame and said first side wall of said groove, and between said periphery mold frame and said second side wall of said groove.

The substrate fitting process of the embodiment of the present invention, wherein the height of said periphery mold frame is 10~15 μm, and the height of said cell mold frame is 25~30 μm, the depth of said groove is 2~3 μm.

The substrate fitting process of the embodiment of the present invention, comprising:

providing a cell mold frame in the middle of a surface of a first substrate, providing a periphery mold frame on the edge of a surface of a second substrate, the height of said cell mold frame is larger than the height of said periphery mold frame;

making said first substrate opposite to said second substrate, the surface of said first substrate on which the cell mold frame is disposed is opposite to the surface of said second substrate on which the periphery mold frame is disposed;

removing the air between said first substrate and said second substrate;

making said first substrate fit with said second substrate preliminarily, said cell mold frame contacts with said second substrate, and a gap between said periphery mold frame and said first substrate is formed;

filling air between said first substrate and said second substrate; and making said first substrate further fit with said second substrate, said periphery mold frame and said first substrate are fitted closely.

The substrate fitting process of the embodiment of the present invention, wherein said first substrate is a color film substrate, said second substrate is an array substrate; or said first substrate is an array substrate, said second substrate is a color film substrate.

The substrate fitting process of the embodiment of the present invention, wherein the height of said periphery mold frame is 10~15 μm, and the height of said cell mold frame is 25~30 μm.

A substrate assembly to be fitted of the embodiment of the present invention, comprising: a substrate, a periphery mold frame formed by periphery sealant is disposed on a surface of said substrate, a cell mold frame formed by main sealant is disposed inside said periphery mold frame, wherein the height of said cell mold frame is larger than the height of said periphery mold frame.

The substrate assembly to be fitted of the embodiment of the present invention, wherein said substrate is an array substrate, or said substrate is a color film substrate.

The substrate assembly to be fitted of the embodiment of the present invention, wherein a ring groove extends along the circumference direction of said substrate disposed on the surface of said substrate, said periphery mold frame is disposed in said groove.

The substrate assembly to be fitted of the embodiment of the present invention, wherein said periphery mold frame and said cell mold frame are completed in a same production process.

The substrate assembly to be fitted of the embodiment of the present invention, wherein said groove comprises a groove bottom, a first side wall located inside said periphery mold frame, and a second side wall located outside said periphery mold frame.

The substrate assembly to be fitted of the embodiment of the present invention, wherein said periphery mold frame is located at said groove bottom of said groove, there are gaps between said periphery mold frame and said first side wall of said groove, and between said periphery mold frame and said second side wall of said groove.

The substrate assembly to be fitted of the embodiment of the present invention, wherein the height of said periphery mold frame is 10~15 μm, and the height of said cell mold frame is 25~30 μm, the depth of said groove is 2~3 μm.

A substrate assembly to be fitted of the embodiment of the present invention, comprising: a first substrate and a second substrate for fitting with said first substrate, a cell mold frame is disposed in the middle of a surface of said first substrate, a periphery mold frame is disposed on the edge of a surface of said second substrate, wherein the height of said cell mold frame is larger than the height of said periphery mold frame, said first substrate is a color film substrate, said second substrate is an array substrate; or said first substrate is an array substrate, said second substrate is a color film substrate.

The substrate assembly to be fitted of the present invention, wherein the height of said periphery mold frame is 10~15 μm, and the height of said cell mold frame is 25~30 μm.

According to the technical solution of the present invention, by setting the height of the cell mold frame and the height of the periphery mold frame differently, the air is supplied into the outside of the cell mold frame when the liquid crystal panel is in cell alignment, thereby the pressure difference inside and outside the cell mold frame is decreased, and the puncture caused by the impact of the in-cell liquid crystal onto the cell mold frame is prevented. Compared with prior art technology, in the present invention, the periphery mold frame does not need to be made any opening, and sealant is not needed at the opening as in the thinning, the time and the costs of the process is decreased, meanwhile the probability of the circuit metal wire and the component switch on the liquid crystal panel suffering corrode of the thinning acid is decreased.

DETAILED DESCRIPTION

Figure 1:
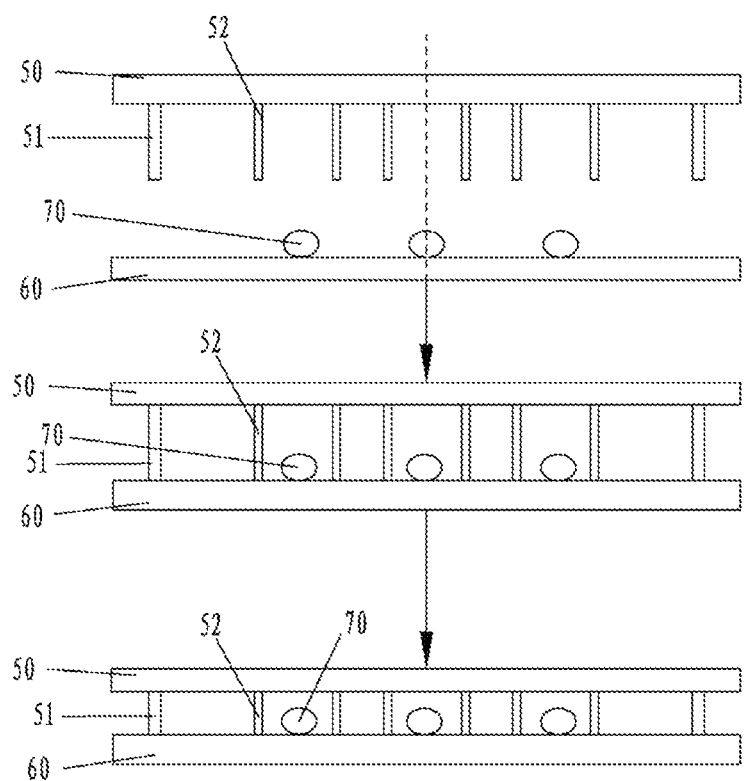
FIG. 1 shows steps of a substrate fitting process of the prior art in a schematic view.

The present invention will be described further referring to the drawings and the specific embodiments hereafter, so as to make the skill in the art to better understand the present invention and implement the present invention, but the listed embodiments are not used as the limitation of the present invention.

Figure 2:
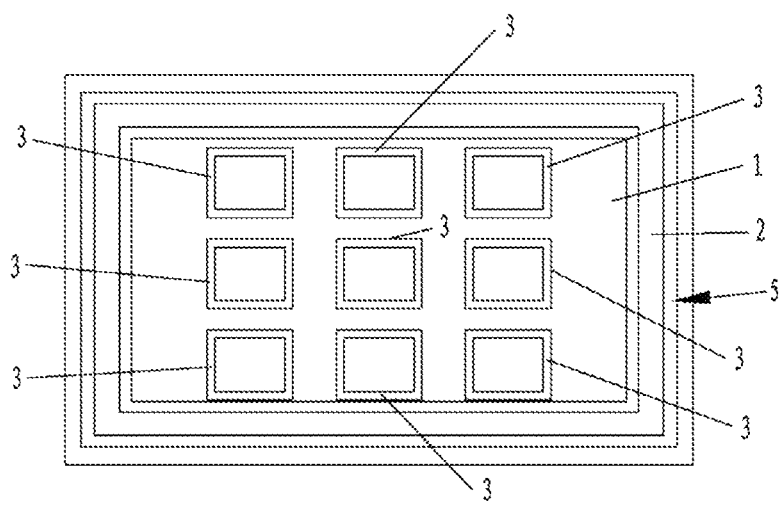
FIG. 2 shows a front view of the structural schematic view of one embodiment of a substrate assembly to be fitted of the present invention.
Figure 3:
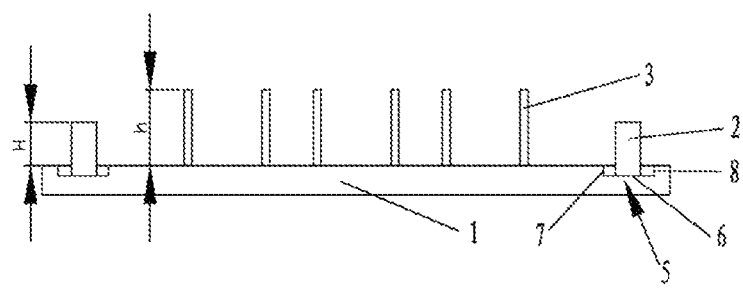
FIG. 3 shows a top view of FIG. 2.

As shown in FIGS. 2 and 3, according to a first embodiment of the substrate assembly to be fitted of the present invention, the substrate assembly to be fitted comprises a substrate 1, a periphery mold frame 2 formed by periphery sealant is disposed on a surface of the substrate 1, a cell mold frame 3 formed by main sealant for sealing liquid crystal is disposed inside the periphery mold frame 2, the height of the cell mold frame 3 is larger than the height of the periphery mold frame 2.

In the present invention, the height of the cell mold frame refers to a distance from the surface on which the cell mold frame is disposed to the top of the cell mold frame; the height of the periphery mold frame refers to a distance from the surface on which the periphery mold frame is disposed to the top of the periphery mold frame.

That is, in the present embodiment, as shown in FIG. 3, the height h of the cell mold frame 3 refers to a distance from the surface of the substrate 1 to the top of the cell mold frame 3; the height H of the periphery mold frame refers to a distance from the surface of the substrate 1 to the top of the periphery mold frame 2.

In the embodiment of the substrate assembly to be fitted of the present invention, wherein the substrate 1 is an array substrate; or the substrate 1 is a color film substrate.

To facilitate the disposition of the periphery mold frame 2, the periphery mold frame 2 and the cell mold frame 3 are completed in a same process, in the embodiment of the substrate assembly to be fitted of the present invention, wherein a ring groove 5 extending along the circumference direction of the substrate 1 is disposed on the surface of the substrate 1, the periphery mold frame 2 is disposed inside the groove 5, so that the periphery mold frame 2 and the cell mold frame 3 can be completed in one gluing process.

In the embodiment of the substrate assembly to be fitted of the present invention, wherein the groove 5 comprises a groove bottom 6, a first side wall 7 located inside the periphery mold frame 2, and a second side wall 8 located outside the periphery mold frame 2, the periphery mold frame 2 is located at the groove bottom 6 of the groove 5, there are gaps between the periphery mold frame 2 and the first side wall 7 of the groove 5, and between the periphery mold frame 2 and the second side wall 8 of the groove 5.

In the embodiment of the substrate assembly to be fitted of the present invention, wherein the height of the periphery mold frame 2 is 10~15 μm, and the height of the cell mold frame 3 is 25~30 μm, the depth of the groove 5 is 2~3 μm.

Figure 4:
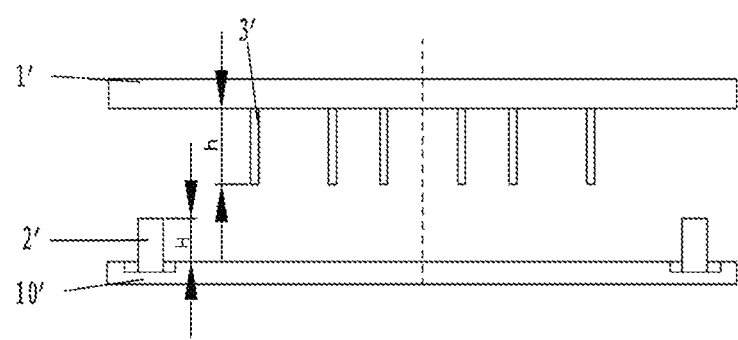
FIG. 4 shows a front view of the structural schematic view of another embodiment of a substrate assembly to be fitted of the present invention.

As shown in FIG. 4, according to a second embodiment of the substrate assembly to be fitted of the present invention, the substrate assembly to be fitted comprises a first substrate 1' and a second substrate 10' for fitting with the first substrate 1', a cell mold frame 3' is disposed in the middle of the surface of the first substrate 1', a periphery mold frame 2' is disposed on the edge of the surface of the second substrate 10', the height of the cell mold frame 3' is larger than the height of the periphery mold frame 2'.

In the present embodiment, as shown in FIG. 4, the height h of the cell mold frame 3' refers to a distance from the surface of the first substrate 1' to the top of the cell mold frame 3'; the height H of the periphery mold frame 2' refers to a distance from the surface of the second substrate 10' to the top of the periphery mold frame 2'.

In the embodiment of the substrate assembly to be fitted of the present invention, wherein the first substrate 1' is a color film substrate, the second substrate 10' is an array substrate; or the first substrate 1' is an array substrate, the second substrate 10' is a color film substrate.

A substrate fitting process according to one embodiment of the present invention comprises:

providing a periphery mold frame on a surface of a first substrate, providing a cell mold frame inside the periphery mold frame, the height of the cell mold frame is larger than the height of the periphery mold frame;

making the first substrate opposite to a second substrate, the surface of the first substrate on which the periphery mold frame and the cell mold frame are disposed is opposite to the second substrate;

removing the air between the first substrate and the second substrate;

making the first substrate fit with the second substrate preliminarily, the cell mold frame contacts with the second substrate, and a gap between the periphery mold frame and the second substrate is formed;

filling air between the first substrate and the second substrate;

making the first substrate further fit with the second substrate, the periphery mold frame and the second substrate are fitted closely.

In the substrate fitting process of the present invention, wherein the first substrate is a color film substrate, the second substrate is an array substrate; or the first substrate is an array substrate, the second substrate is a color film substrate.

In the substrate fitting process of the present invention, wherein before providing the periphery mold frame on the surface of the first substrate, providing a ring groove extending along the circumference direction of the first substrate on the surface of the first substrate, then providing the periphery mold frame inside the groove.

The substrate fitting process according to another embodiment of the present invention comprises:

providing a cell mold frame in the middle of a surface of a first substrate, providing a periphery mold frame on the edge of the surface of a second substrate, the height of the cell mold frame is larger than the height of the periphery mold frame;

making the first substrate opposite to the second substrate, the surface of the first substrate on which the cell mold frame is disposed is opposite to the surface of the second substrate on which the periphery mold frame is disposed;

removing the air between the first substrate and the second substrate;

making the first substrate fit with the second substrate preliminarily, the cell mold frame contacts with the second substrate, and a gap between the periphery mold frame and the first substrate is formed;

filling air between the first substrate and the second substrate;

making the first substrate further fit with the second substrate, the periphery mold frame and the first substrate are fitted closely.

In the substrate fitting process of the present invention, wherein the first substrate is a color film substrate, the second substrate is an array substrate; or the first substrate is an array substrate, the second substrate is a color film substrate.

Figure 5:
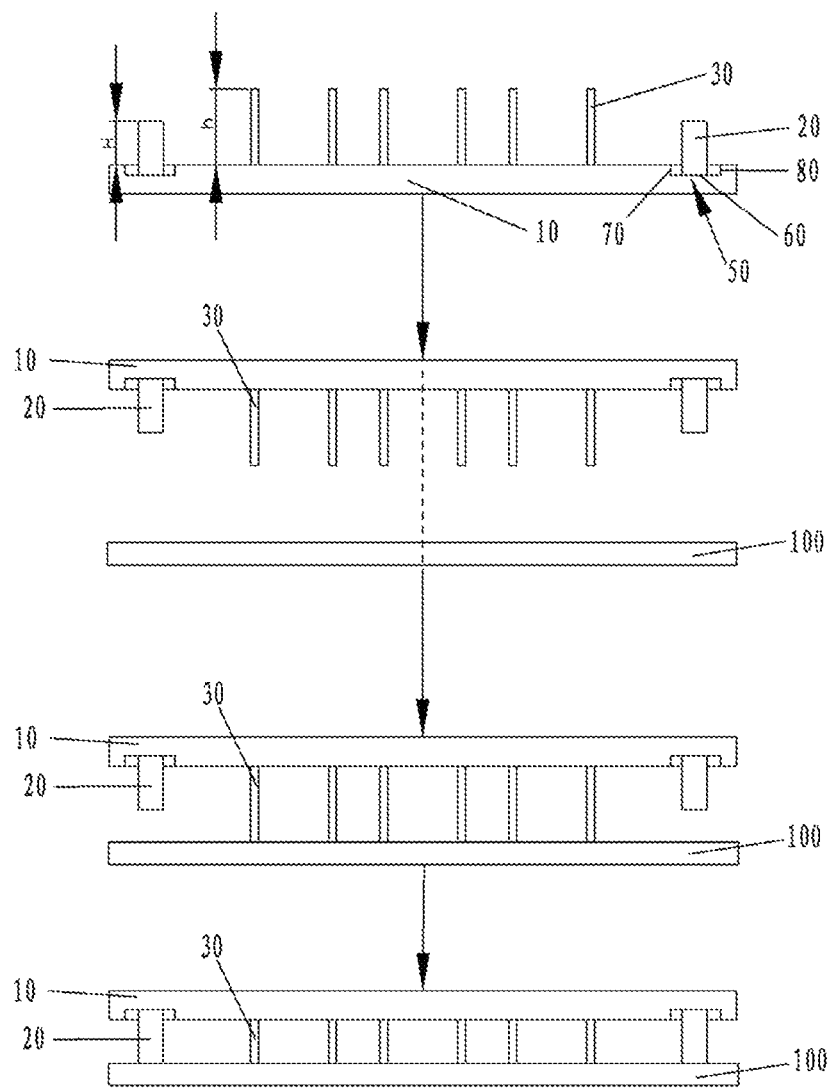
FIG. 5 shows steps of one embodiment of a substrate fitting process of the present invention.

As shown in FIG. 5, a substrate fitting process for forming a liquid crystal panel according to a first embodiment of the present invention comprises:

providing a periphery mold frame 20 on a surface of a first substrate 10, providing a cell mold frame 30 inside the periphery mold frame 20, the height of the cell mold frame 30 is larger than the height of the periphery mold frame 20;

making the first substrate 10 opposite to a second substrate 100, the surface of the first substrate 10 on which the periphery mold frame 20 and the cell mold frame 30 are disposed is opposite to the second substrate 100;

removing the air between the first substrate 10 and the second substrate 100;

making the first substrate 10 fit with the second substrate 100 preliminarily, the cell mold frame 30 contacts with the second substrate 100, and a gap between the periphery mold frame 20 and the second substrate 100 is formed;

filling air between the first substrate 10 and the second substrate 100;

making the first substrate 10 further fit with the second substrate 100, the periphery mold frame 20 and the second substrate 100 are fitted closely.

In the present embodiment, the height h of the cell mold frame 30 refers to a distance from the surface of the first substrate 10 to the top of the cell mold frame 30; the height H of the periphery mold frame 20 refers to a distance from the surface of the first substrate 10 to the top of the periphery mold frame 20.

To facilitate the disposition of the periphery mold frame 20, the periphery mold frame 20 and the cell mold frame 30 are completed in a same process, in the embodiment of the substrate fitting process of the present invention, wherein before providing the periphery mold frame 20 on the surface of the first substrate 10, providing a ring groove 50 extends along the circumference direction of the first substrate 10 on the surface of the first substrate 10, then providing the periphery mold frame 20 inside the groove 50, so that the periphery mold frame 20 and the cell mold frame 30 can be completed in one gluing process.

In the embodiment of the substrate fitting process of the present invention, wherein the groove 50 comprises a groove bottom 60, a first side wall 70 located inside the periphery mold frame 20, and a second side wall 80 located outside the periphery mold frame 20, the periphery mold frame 20 is located at the groove bottom 60 of the groove 50, there are gaps between the periphery mold frame 20 and the first side wall 70 of the groove 50, and between the periphery mold frame 20 and the second side wall 80 of the groove 50.

In the embodiment of the substrate fitting process of the present invention, wherein the first substrate 10 is a color film substrate, the second substrate 100 is an array substrate; or, the first substrate 10 is an array substrate, the second substrate 100 is a color film substrate.

Figure 6:
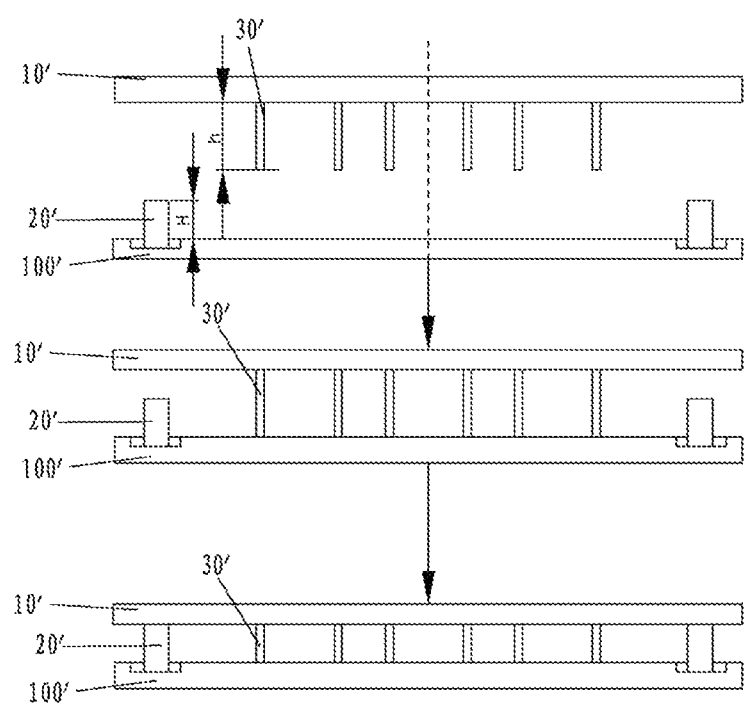
FIG. 6 shows steps of another embodiment of a substrate fitting process of the present invention.

As shown in FIG. 6, a substrate fitting process for forming the liquid crystal panel according to the second embodiment of the present invention comprises:

providing a cell mold frame 30' in the middle of a surface of a first substrate 10', providing a periphery mold frame 20' on the edge of the surface of a second substrate 100', the height of the cell mold frame 30' is larger than the height of the periphery mold frame 20';

making the first substrate 10' opposite to the second substrate 100', the surface of the first substrate 10' on which the cell mold frame 30' is disposed is opposite to the surface of the second substrate 100' on which the periphery mold frame 20' is disposed;

removing the air between the first substrate 10' and the second substrate 100';

making the first substrate 10' fit with the second substrate 100' preliminarily, the cell mold frame 30' contacts with the second substrate 100', and a gap between the periphery mold frame 20' and the first substrate 10' is formed;

filling air between the first substrate 10' and the second substrate 100';

making the first substrate 10' further fit with the second substrate 100', the periphery mold frame 20' and the first substrate 10' are fitted closely.

In the present embodiment, the height h of the cell mold frame 30' refers to a distance from the surface of the first substrate 10' to the top of the cell mold frame 30'; the height H of the periphery mold frame 20' refers to a distance from the surface of the second substrate 100' to the top of the periphery mold frame 20'.

In the embodiment of the substrate fitting process of the present invention, wherein the first substrate 10' is a color film substrate, the second substrate 100' is an array substrate; or the first substrate 10' is an array substrate, the second substrate 100' is a color film substrate.

According to the technical solution of the present invention, by setting the height of the cell mold frame and the height of the periphery mold frame differently, the air is supplied into the outside of the cell mold frame when the liquid crystal panel is in cell alignment, thereby the pressure difference inside and outside the cell mold frame is decreased, and the puncture caused by the impact of the in-cell liquid crystal onto the cell mold frame is prevented. Compared with prior art technology, in the present invention, the periphery mold frame does not need to be made any opening, and sealant is not needed at the opening as in the thinning, the time and the costs of the process is decreased, meanwhile the probability of the circuit metal wire and the component switch on the liquid crystal panel suffering corrode of the thinning acid is decreased.

The described above are only the preferred embodiments of the present invention, it should be pointed out that, it can be made some improvements and embellish on the premise of without departing from the principle of the present invention by those skilled in the art, these improvements and embellish should be seen as the protection scope of the present invention as well.

What is claimed is:

1. A substrate fitting process, comprising:
    providing a ring groove extending along a circumference direction of a first substrate on a surface of said first substrate;
    providing a periphery mold frame inside said groove, providing a cell mold frame inside said periphery mold frame, the height of said cell mold frame is larger than the height of said periphery mold frame;
    making said first substrate opposite to a second substrate, the surface of said first substrate on which the periphery mold frame and the cell mold frame are disposed is opposite to said second substrate;
    removing the air between the first substrate and the second substrate;
    making said first substrate fit with said second substrate preliminarily, said cell mold frame contacts with said second substrate, and a gap between said periphery mold frame and said second substrate is formed;
    filling the air between said first substrate and said second substrate;
    making said first substrate further fit with said second substrate, said periphery mold frame and said second substrate are fitted closely.

2. The substrate fitting process according to claim 1, wherein said first substrate is a color film substrate, said second substrate is an array substrate; or said first substrate is an array substrate, said second substrate is a color film substrate.

3. The substrate fitting process according to claim 1, wherein said periphery mold frame and said cell mold frame are completed in a same production process.

4. The substrate fitting process according to claim 1, wherein said groove comprises a groove bottom, a first side wall located inside said periphery mold frame, and a second side wall located outside said periphery mold frame.

5. The substrate fitting process according to claim 4, wherein said periphery mold frame is located at said groove bottom of said groove, there are gaps between said periphery mold frame and said first side wall of said groove, and between said periphery mold frame and said second side wall of said groove.

6. The substrate fitting process according to claim 1, wherein the height of said periphery mold frame is 10~15 μm, and the height of said cell mold frame is 25~30 μm, the depth of said groove is 2~3 μm.

7. A substrate fitting process, comprising:
    providing a cell mold frame in the middle of a surface of a first substrate;
    providing a ring groove extending along a circumference direction of a second substrate on an edge of a surface of said second substrate;

providing a periphery mold frame inside said groove, the height of said cell mold frame is larger than the height of said periphery mold frame;

making said first substrate opposite to said second substrate, the surface of said first substrate on which the cell mold frame is disposed is opposite to the surface of said second substrate on which the periphery mold frame is disposed;

removing the air between said first substrate and said second substrate;

making said first substrate fit with said second substrate preliminarily, said cell mold frame contacts with said second substrate, and a gap between said periphery mold frame and said first substrate is formed;

filling the air between said first substrate and said second substrate;

making said first substrate further fit with said second substrate, said periphery mold frame and said first substrate are fitted closely.

8. The substrate fitting process according to claim 7, wherein said first substrate is a color film substrate, said second substrate is an array substrate; or said first substrate is an array substrate, said second substrate is a color film substrate.

9. The substrate fitting process according to claim 7, wherein the height of said periphery mold frame is 10~15 µm, and the height of said cell mold frame is 25~30 µm.

10. A substrate assembly to be fitted, comprising: a substrate, a periphery mold frame formed by periphery sealant is disposed on a surface of said substrate, a cell mold frame formed by main sealant is disposed inside said periphery mold frame, wherein the height of said cell mold frame is larger than the height of said periphery mold frame;

wherein a ring groove extends along the circumference direction of said substrate disposed on the surface of said substrate, said periphery mold frame is disposed in said groove.

11. The substrate assembly to be fitted according to claim 10, wherein said substrate is an array substrate, or said substrate is a color film substrate.

12. The substrate assembly to be fitted according to claim 10, wherein said periphery mold frame and said cell mold frame are completed in a same production process.

13. The substrate assembly to be fitted according to claim 10, wherein said groove comprises a groove bottom, a first side wall located inside said periphery mold frame, and a second side wall located outside said periphery mold frame.

14. The substrate assembly to be fitted according to claim 13, wherein said periphery mold frame is located at said groove bottom of said groove, there are gaps between said periphery mold frame and said first side wall of said groove, and between said periphery mold frame and said second side wall of said groove.

15. The substrate assembly to be fitted according to claim 10, wherein the height of said periphery mold frame is 10~15 µm, and the height of said cell mold frame is 25~30 µm, the depth of said groove is 2~3 µm.

\* \* \* \* \*